(12) United States Patent
Marion et al.

(10) Patent No.: US 7,596,758 B2
(45) Date of Patent: Sep. 29, 2009

(54) METHOD OF APPENDING A GROUP OF FILES TO FILES ON A CLIPBOARD OF A DESKTOP

(75) Inventors: Neal Richard Marion, Georgetown, TX (US); George F. Ramsay, III, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 10/406,653

(22) Filed: Apr. 3, 2003

(65) Prior Publication Data

US 2004/0207660 A1 Oct. 21, 2004

(51) Int. Cl.
*G06F 3/00* (2006.01)

(52) U.S. Cl. .................. 715/770; 715/843; 715/841

(58) Field of Classification Search ............. 715/770, 715/843, 769, 841
See application file for complete search history.

(56) References Cited

U.S. PATENT DOCUMENTS

| | | | | |
|---|---|---|---|---|
| 5,420,976 | A * | 5/1995 | Schell et al. ............... | 715/810 |
| 5,428,734 | A | 6/1995 | Haynes et al. | |
| 6,147,685 | A | 11/2000 | Bliss et al. | |
| 6,393,429 | B1 * | 5/2002 | Yagi et al. ................ | 707/102 |
| 6,526,215 | B2 | 2/2003 | Hirai et al. | |
| 6,944,821 | B1 * | 9/2005 | Bates et al. ............... | 715/530 |
| 6,961,907 | B1 * | 11/2005 | Bailey ....................... | 715/770 |
| 7,039,580 | B1 * | 5/2006 | Brown et al. .............. | 705/23 |
| 2001/0013877 | A1 * | 8/2001 | Fujino ....................... | 345/835 |
| 2002/0033844 | A1 * | 3/2002 | Levy et al. ................ | 345/744 |
| 2002/0186258 | A1 | 12/2002 | Shibata | |
| 2003/0007007 | A1 * | 1/2003 | Hinegardner et al. ..... | 345/769 |
| 2003/0142146 | A1 * | 7/2003 | Al-Azzawe et al. ....... | 345/854 |
| 2003/0184587 | A1 | 10/2003 | Ording et al. | |
| 2004/0039701 | A1 | 2/2004 | Nakamura et al. | |
| 2004/0070622 | A1 * | 4/2004 | Cossey et al. ............. | 345/769 |
| 2004/0189711 | A1 | 9/2004 | Misawa | |
| 2005/0172241 | A1 * | 8/2005 | Daniels et al. ............. | 715/770 |
| 2005/0177796 | A1 * | 8/2005 | Takahashi .................. | 715/769 |

(Continued)

OTHER PUBLICATIONS

*Multiple Item On-Line Clipboard*, IBM Technical Disclosure Bulletin vol. 35, No. 2, p. 425, Jul. 1992.

(Continued)

*Primary Examiner*—Sy D Luu
(74) *Attorney, Agent, or Firm*—Volel Emile; Mark McBurney; Diana Gerhardt

(57) ABSTRACT

A system, apparatus and method of appending a group of files to files on a clipboard of a desktop are provided. The system, apparatus and method include displaying a first window having an option that allows a group of files to be appended to files on the clipboard and asserting the option to append the files. The first window is ordinarily displayed after at least one file has been copied onto the clipboard and a second file is selected to be copied. In the case where at least one file has not already been copied onto the clipboard, a second window is displayed. The second window has an option that allows only one file or group of files to be copied onto the clipboard. The first window further contains an option that allows a file or a group of files to replace file or files already copied on the clipboard.

2 Claims, 7 Drawing Sheets

U.S. PATENT DOCUMENTS

2006/0085756 A1* 4/2006 Srivastava et al. ........... 715/770

OTHER PUBLICATIONS

*Append Feature for Clipboards*, IBM Technical Disclosure Bulletin vol. 36, No. 06B, pp. 271-272, Jun. 1993.

*A Method for Copying Executable Files and All Load-Time Dynamically Linked Libraries in Another Directory*, IBM Reseacrch Disclosure vol. 463, No. 111, Nov. 2002.

*Improved Design for Graying and Enabling of the Paste Action*, IBM Technical Disclosure Bulletin vol. 34, No. 9, pp. 174-175, Feb. 2002.

* cited by examiner

METHOD OF APPENDING A GROUP OF FILES TO FILES ON A CLIPBOARD OF A DESKTOP

CROSS-REFERENCE TO RELATED APPLICATIONS

The present invention is related to the following U.S. Patent Application which is incorporated by reference.

Ser. No. 10/159,509, filed May 30, 2002, entitled, DATA PROCESSOR CONTROLLED DISPLAY SYSTEM WITH DRAG AND DROP MOVEMENT OF DISPLACED ITEMS FROM SOURCE TO DESTINATION SCREEN POSII-TONS AND INTERACTIVE MODIFICATION OF DRAGGED ITEMS DURING THE MOVEMENT.

BACKGROUND OF THE INVENTION

1. Technical Field

The present invention is directed to desktops. More particularly, the invention is directed to an apparatus, system and method of appending a group of files to files on a clipboard of a desktop.

2. Description of Related Art

Most desktops allow a user to remove or copy a file or a group of files from a directory or folder. To remove the file or group of files from the folder is generally referred to as "cut" or "delete" whereas to copy the file or group of files is referred to as "copy". To transfer the copied file or group of files to another folder is referred to as "paste".

When the file or group of files is copied, it is ordinarily transferred to a temporary buffer called a clipboard. This allows the user to later paste the file or group of files in other folders. Note that copying files will henceforth be referred to as copying the files onto the clipboard or plainly "copy".

In the past, when two file copy operations were made in succession, the selected file or group of files from the first copy operation was replaced with the selected file or group of files from the second copy operation. Thus, if a user desired to add a file or a group of files to a file or files that had been copied onto the clipboard, the user had to select all the files (including the ones already on the clipboard) in order to copy them on the clipboard. Clearly, depending on the location of the files, this could be a rather time-consuming endeavor.

Consequently, there is a need for an apparatus, system and method of appending a group of files to files on a clipboard.

SUMMARY OF THE INVENTION

The present invention provides a system, apparatus and method of appending a group of files to files on a clipboard of a desktop. The system, apparatus and method include displaying a first window having an option that allows a group of files to be appended to files on the clipboard and asserting the option to append the files. The first window is ordinarily displayed after at least one file has been copied onto the clipboard and a second file is selected to be copied. In the case where at least one file has not already been copied onto the clipboard, a second window is displayed. The second window has an option that allows only one file or group of files to be copied onto the clipboard. The first window further contains an option that allows a file or a group of files to replace file or files already copied on the clipboard.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
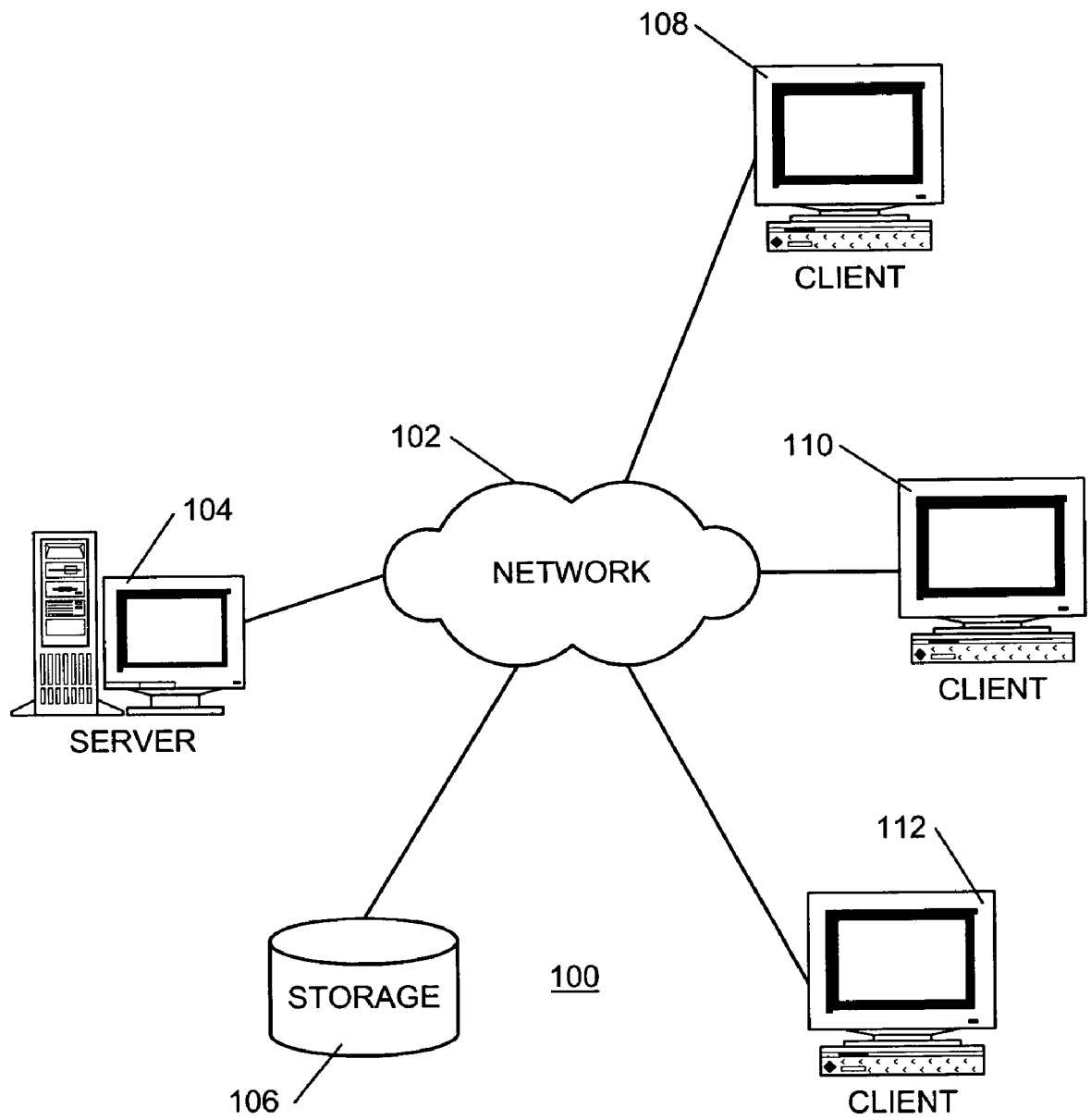
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
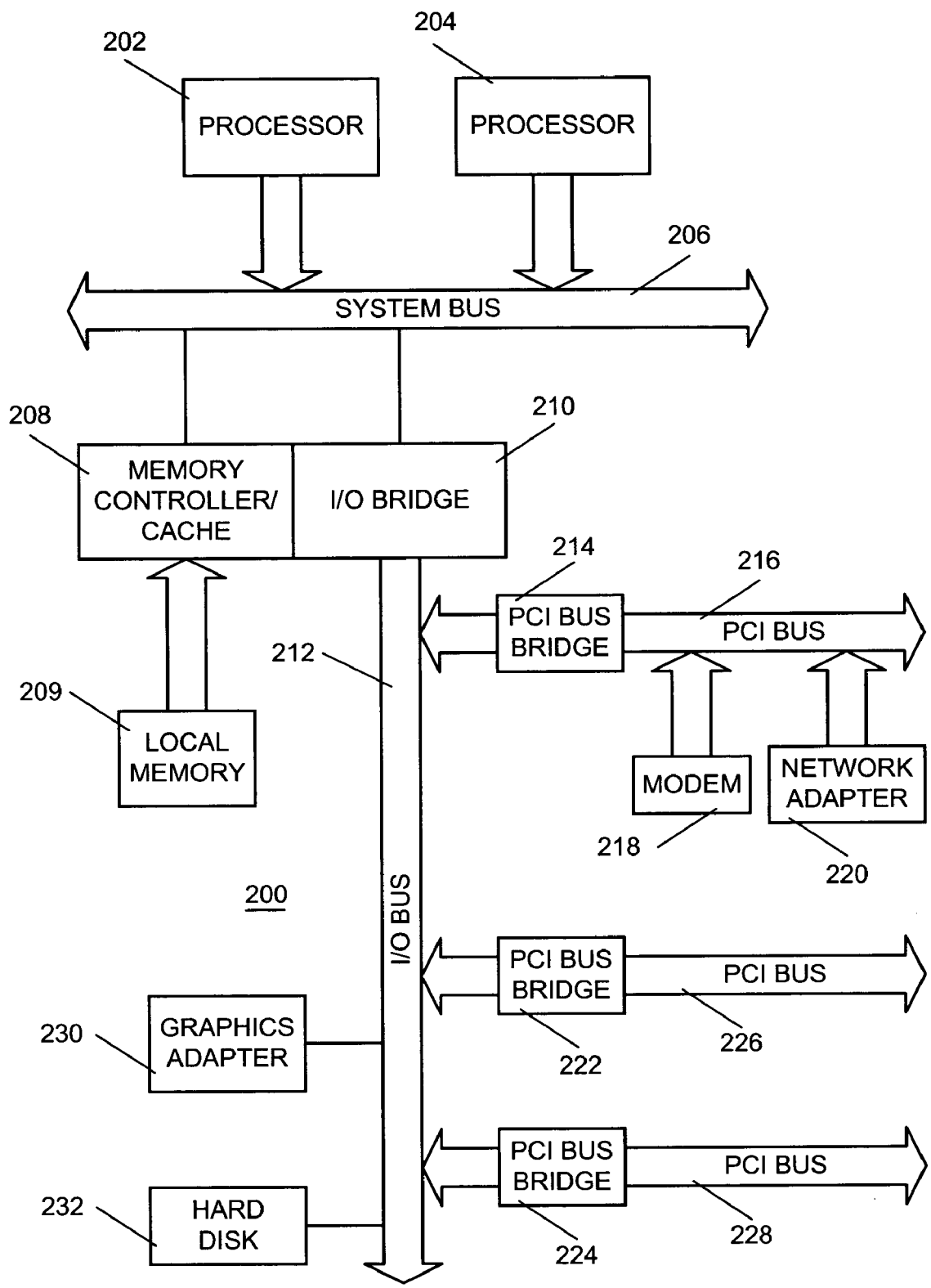
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
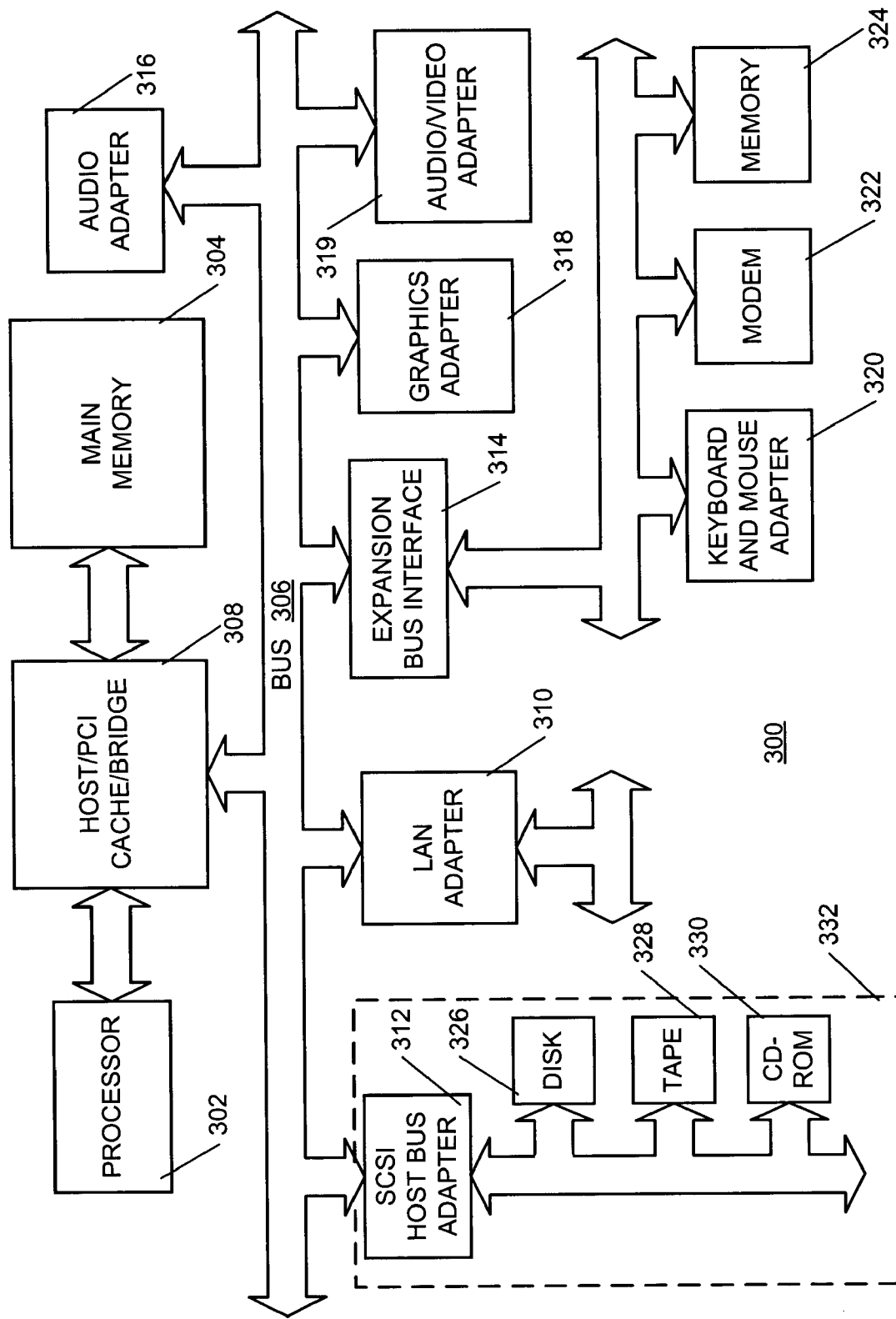
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus, system and method of appending a file or a group of files to files on a clipboard. The invention may be local to client systems 108, 110 and 112 of FIG. 1 or to the server 104 or to both the server 104 and clients 108, 110 and 112 and may reside on any data storage medium (i.e., floppy disk, compact disk, hard disk, ROM, RAM, etc.) used by a computer system.

Figure 4:
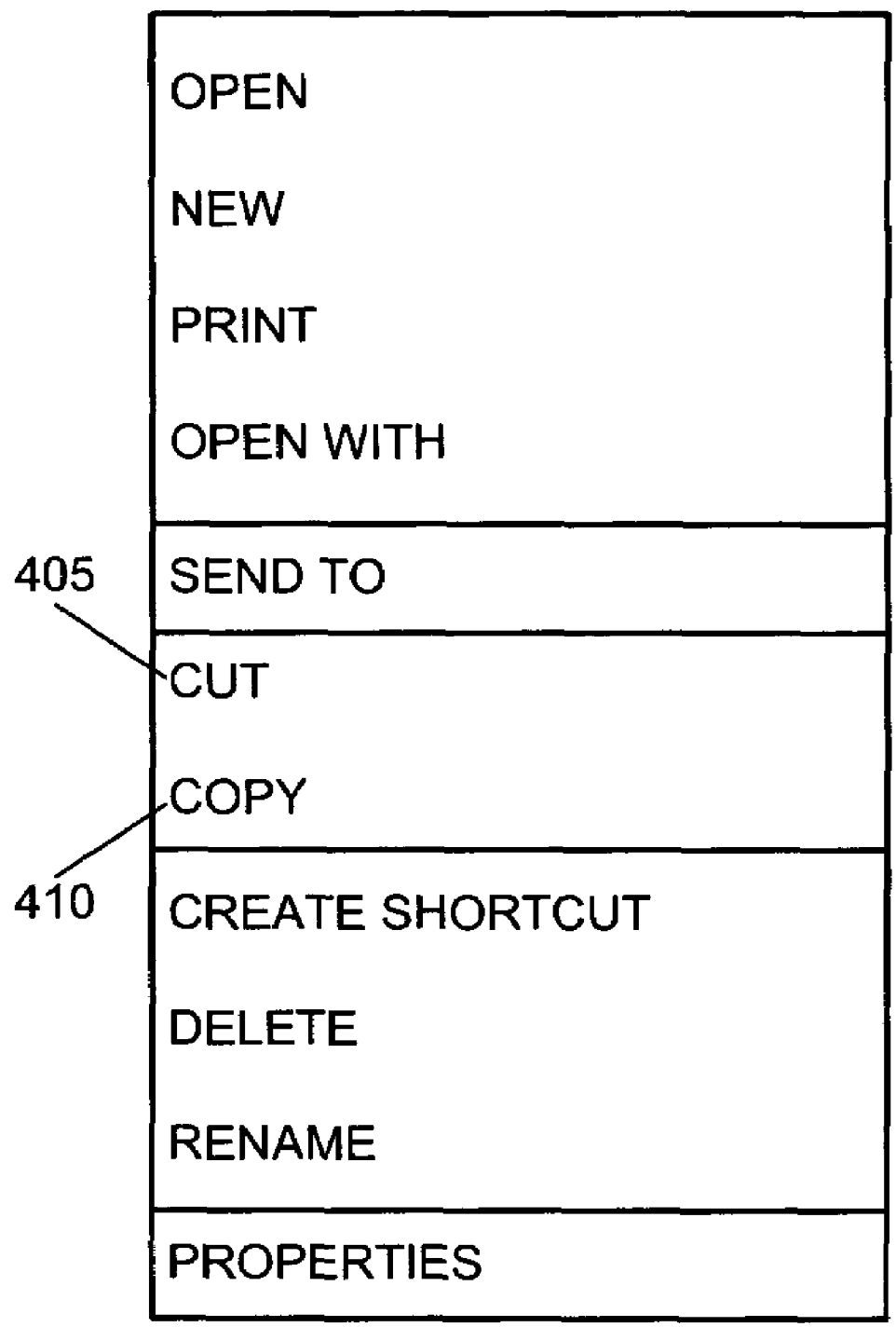
FIG. 4 depicts a pop-up window having an option that allows a user to copy files onto a clipboard.

The present invention will be explained using Microsoft® Windows XP. When a user puts the mouse pointer on a file or select a plurality of files and depresses the right button of the mouse a window pops open indicating a plurality of options available to the user. FIG. 4 depicts the plurality of options that may be made available to the user. (Note that in the figure only the items that are pertinent to the invention are given a reference numeral.) If the user selects cut 405, the file or files will be deleted from the folder within which it is located. If the user selects copy, the file or files will be copied onto the clipboard.

Figure 5:
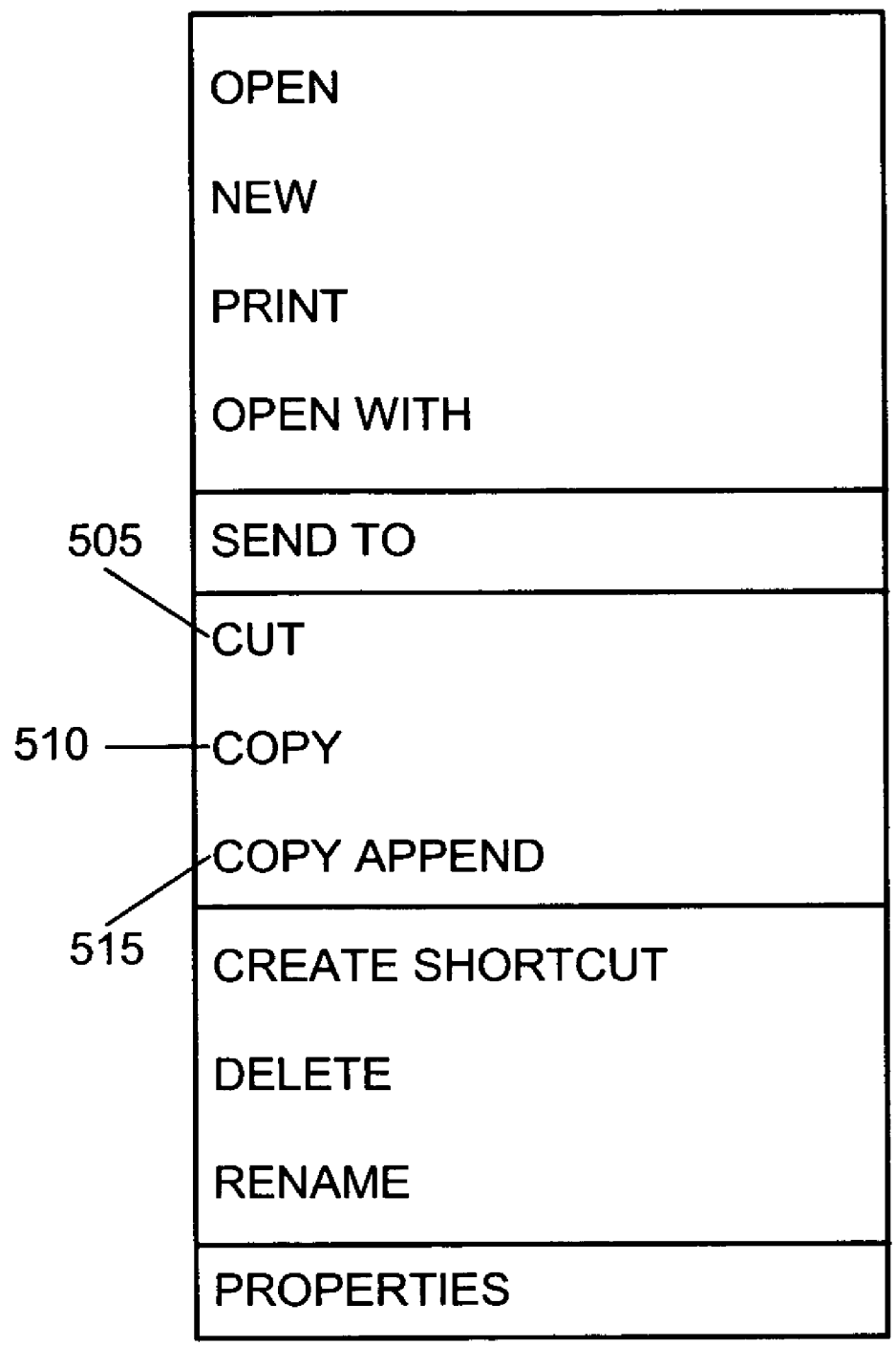
FIG. 5 depicts another pop-up window having an option that allows a user to append files to files on a clipboard.

FIG. 5 depicts a pop-up window that may be used by the present invention. When a file or a group of files has previously been copied onto the clipboard and the user positions the mouse pointer on any file or selects another group of files and depresses the right button of the mouse, FIG. 5 will pop open. As before, only the items that are of importance to the invention are given a reference numeral. Cut 505 and copy 510 perform the same function as cut 405 and copy 410. Specifically, if cut 510 is chosen, the selected file or group of files will replace the file previously copied on the clipboard. However, when copy append 515 is chosen, the selected file or group of files will be appended to the previous file or files on the clipboard. When the user desires, the files may be pasted in a folder.

Figure 6:
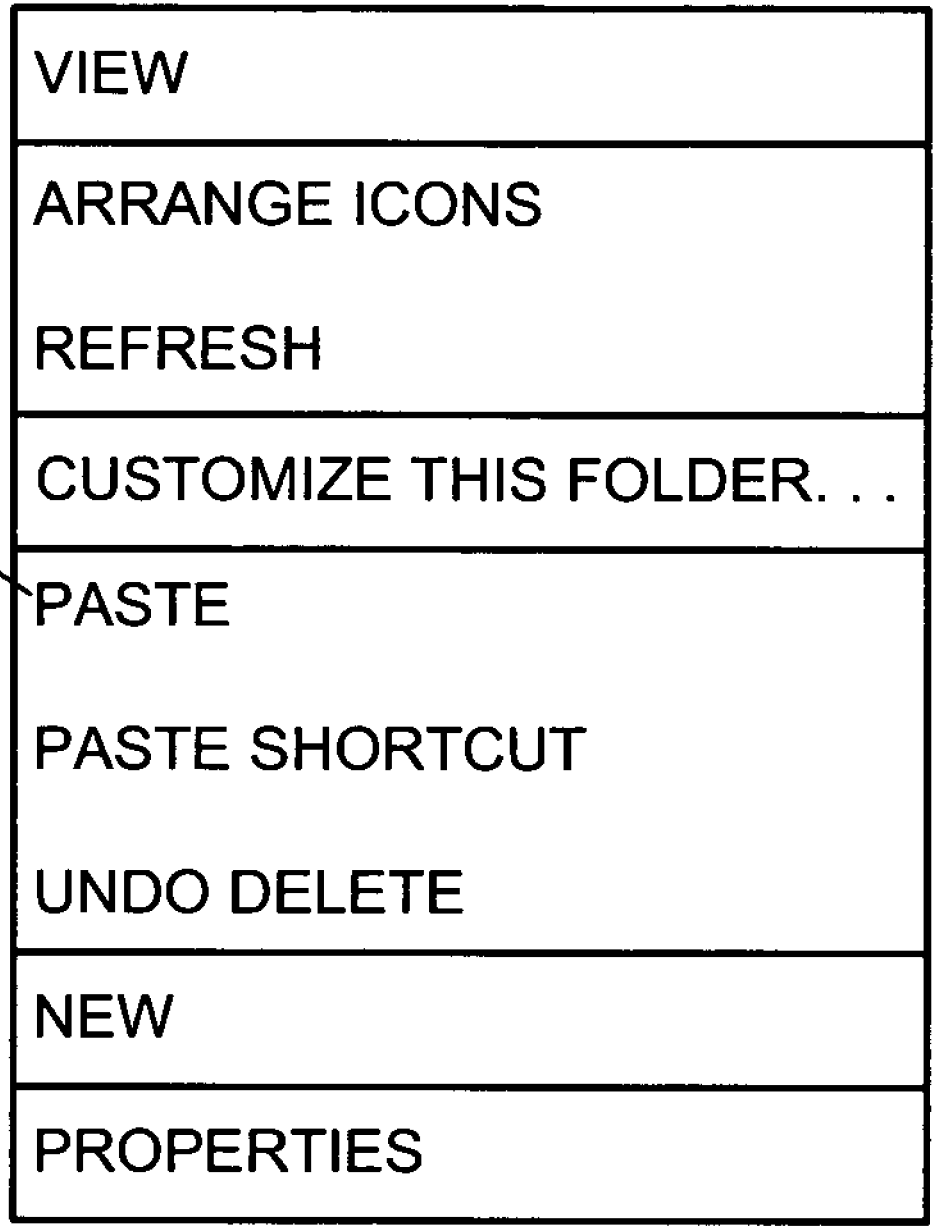
FIG. 6 depicts a pop-up window that allows a user to paste files in a folder.

Note that any number of files or group of files may be appended to each other on the clipboard so long as the user continues to choose copy append 515 instead of copy 510. In any case, to paste the files, the user needs to right click on the mouse while the mouse pointer is not on a file. When this occurs, FIG. 6 will pop open. By left clicking on paste 605, the files will be pasted into an open folder.

Figure 7:
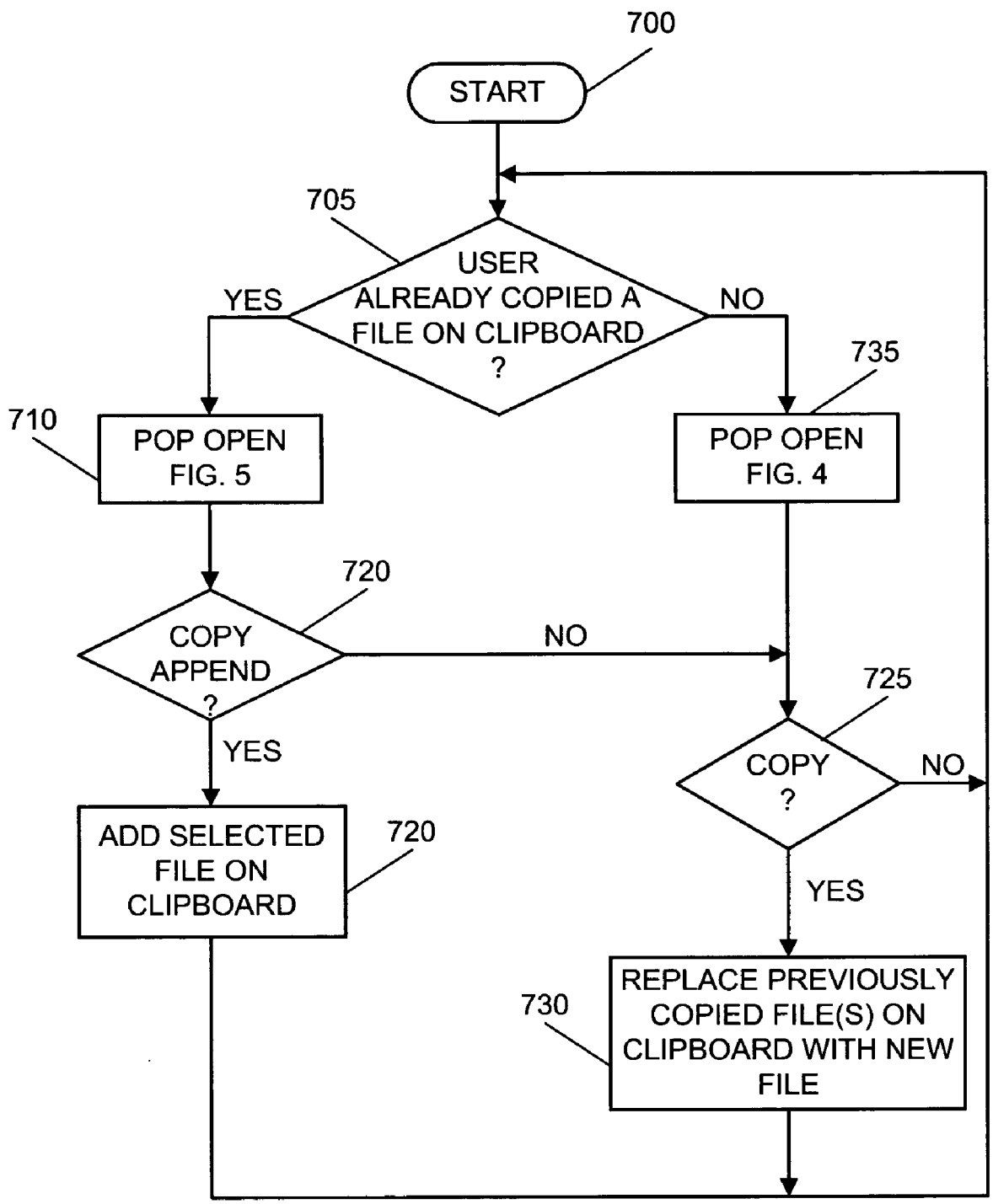
FIG. 7 is flow diagram of a process used by the present invention.

FIG. 7 is a flow chart of a process that may be used by the invention. The process starts when a user decides to copy a file or a group of files on the clipboard (step 700). Then, a check is made to determine whether at least one file has already been copied onto the clipboard. If so, FIG. 5 will pop open given the user the option to either choose copy 510 or copy append 515. If copy append is chosen, the selected file or files will be appended to the files or files already on the clipboard and the process will return to step 705 (steps 705, 710, 715 and 720). If copy 510 is chosen, then the selected file or files will replace all files already copied onto the clipboard and the process will return to step 705 (steps 705, 710, 715, 725 and 730).

If at least one file has not already been copied onto the clipboard, then FIG. 4 will pop open. At that point, the user may copy the selected file onto the clipboard as customary and the process will return to step 705 (steps 705, 735, 725 and 730).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of copying files onto a clipboard of a desktop comprising:
    selecting at least one file to copy onto the clipboard;
    determining, in response to selecting the at least one file to copy onto the clipboard, whether there is at least one file already copied onto the clipboard;
    displaying in a first pop-up window having a first option and a second option in response to determining that there is at least one file already copied onto the clipboard, the first option allowing the at least one selected file to be appended to the at least one file already copied onto the clipboard, the second option allowing the at least one selected file to replace the at least one file already copied onto the clipboard;
    displaying a second pop-up window, in response to determining that there is not at least one file already copied onto the clipboard, the second pop-up window having a third option to allow the selected file to be copied onto the clipboard;
    enabling a user to assert the first option to append the at least one selected file to the file already copied onto the clipboard or the second option to allow the at least one selected file to replace the at least one file already copied on the clipboard when it is determined that there is at least one file already copied onto the clipboard or the third option to copy the at least one selected file onto the clipboard when it is determined that there is not at least one file already copied onto the clipboard; and
    appending the at least one selected file to the file already copied onto the clipboard in response to the user asserting the first option, replacing the at least one file already copied onto the clipboard with the at least one selected file in response to the user asserting the second option, copying the at least one selected file onto the clipboard in response to the user asserting the third option.

2. The method of claim 1 wherein when more than one file is copied on the clipboard, the more than one file may be pasted using one paste operation.

* * * * *

UNITED STATES PATENT AND TRADEMARK OFFICE
CERTIFICATE OF CORRECTION

PATENT NO. : 7,596,758 B2  Page 1 of 1
APPLICATION NO. : 10/406653
DATED : September 29, 2009
INVENTOR(S) : Marion et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1847 days.

Signed and Sealed this

Fourteenth Day of December, 2010

David J. Kappos
*Director of the United States Patent and Trademark Office*